(12) United States Patent
Vasseur et al.

(10) Patent No.: US 10,944,661 B2
(45) Date of Patent: Mar. 9, 2021

(54) WIRELESS THROUGHPUT ISSUE DETECTION USING COARSELY SAMPLED APPLICATION ACTIVITY

(71) Applicant: Cisco Technology, Inc., San Jose, CA (US)

(72) Inventors: Jean-Philippe Vasseur, Saint Martin D'urlage (FR); Grégory Mermoud, Veyras (CH); Abhishek Kumar, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 79 days.

(21) Appl. No.: 15/682,674

(22) Filed: Aug. 22, 2017

(65) Prior Publication Data

US 2019/0068474 A1    Feb. 28, 2019

(51) Int. Cl.
  *H04L 12/26* (2006.01)
  *H04L 12/24* (2006.01)
  *H04L 29/08* (2006.01)

(52) U.S. Cl.
  CPC ........ *H04L 43/0888* (2013.01); *H04L 41/142* (2013.01); *H04L 41/145* (2013.01); *H04L 69/329* (2013.01); *H04L 67/22* (2013.01)

(58) Field of Classification Search
  CPC .... H04L 41/145; H04L 43/0894; H04L 45/08
  See application file for complete search history.

(56) References Cited

U.S. PATENT DOCUMENTS

| | | | |
|---|---|---|---|
| 9,264,338 B1* | 2/2016 | Leonard | H04L 41/0681 |
| 9,356,942 B1* | 5/2016 | Joffe | H04L 63/1408 |
| 2015/0341379 A1* | 11/2015 | Lefebvre | H04L 63/1425 726/22 |
| 2016/0217022 A1* | 7/2016 | Velipasaoglu | G06F 11/079 |
| 2016/0219070 A1* | 7/2016 | Vasseur | H04L 45/306 |
| 2017/0272310 A1* | 9/2017 | Rengarajan | H04L 41/08 |
| 2018/0123901 A1* | 5/2018 | Yermakov | H04L 41/145 |
| 2018/0234320 A1* | 8/2018 | Paulraj | H04L 43/0888 |

FOREIGN PATENT DOCUMENTS

WO    WO-2016119822 A1    8/2016

OTHER PUBLICATIONS

Yu et al., "Profiling Network Performance for Multi-Tier Data Center Applications", NSDI'11 Proceedings of the 8th USENIX conference on Networked systems design and implementation, 2011, pp. 57-70, USENIX Association.

* cited by examiner

*Primary Examiner* — Chris Parry
*Assistant Examiner* — Steven C Nguyen
(74) *Attorney, Agent, or Firm* — Behmke Innovation Group LLC; Kenneth J. Heywood; James J. Wong

(57) ABSTRACT

In one embodiment, a service in a network samples application traffic throughputs for a set of applications present in a network. The service generates a throughput model based on the sampled application throughputs for the set of applications. The service performs anomaly detection on wireless throughput measurements from the network by comparing the wireless throughput measurements to the generated throughput model. The service sends an anomaly detection notification based on a determination that the wireless throughput measurements from the network are anomalous.

20 Claims, 12 Drawing Sheets

WIRELESS THROUGHPUT ISSUE DETECTION USING COARSELY SAMPLED APPLICATION ACTIVITY

TECHNICAL FIELD

The present disclosure relates generally to computer networks, and, more particularly, to detecting wireless throughput issue detection using coarsely sampled application activity.

BACKGROUND

Many network assurance systems rely on predefined rules to determine the health of the network. In turn, these rules can be used to trigger corrective measures and/or notify a network administrator as to the health of the network. For instance, in an assurance system for a wireless network, one rule may comprise a defined threshold for what is considered as an acceptable number of clients per access point (AP) or the channel interference, itself. More complex rules may also be created to capture conditions over time, such as a number of events in a given time window or rates of variation of metrics (e.g., the client count, channel utilization, etc.).

One network characteristic that can be of interest in a network assurance system is wireless throughput within a monitored network. In general, wireless throughput is influenced by a number of factors including: the functioning of the hardware components, the amount and type of network traffic and clients connected to the network, environmental effects related to location and neighboring wireless devices, the application behavior itself especially in the presence of networking issues (packet drops, variability of networking delays e.g. delay, jitter), as well as purely behavioral aspects related to how the end-user consumes the wireless signal. Put together, this represents a large and often confounding set of factors, making it almost impossible to reliably create rules in a network assurance system with which wireless throughput issues can be detected.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
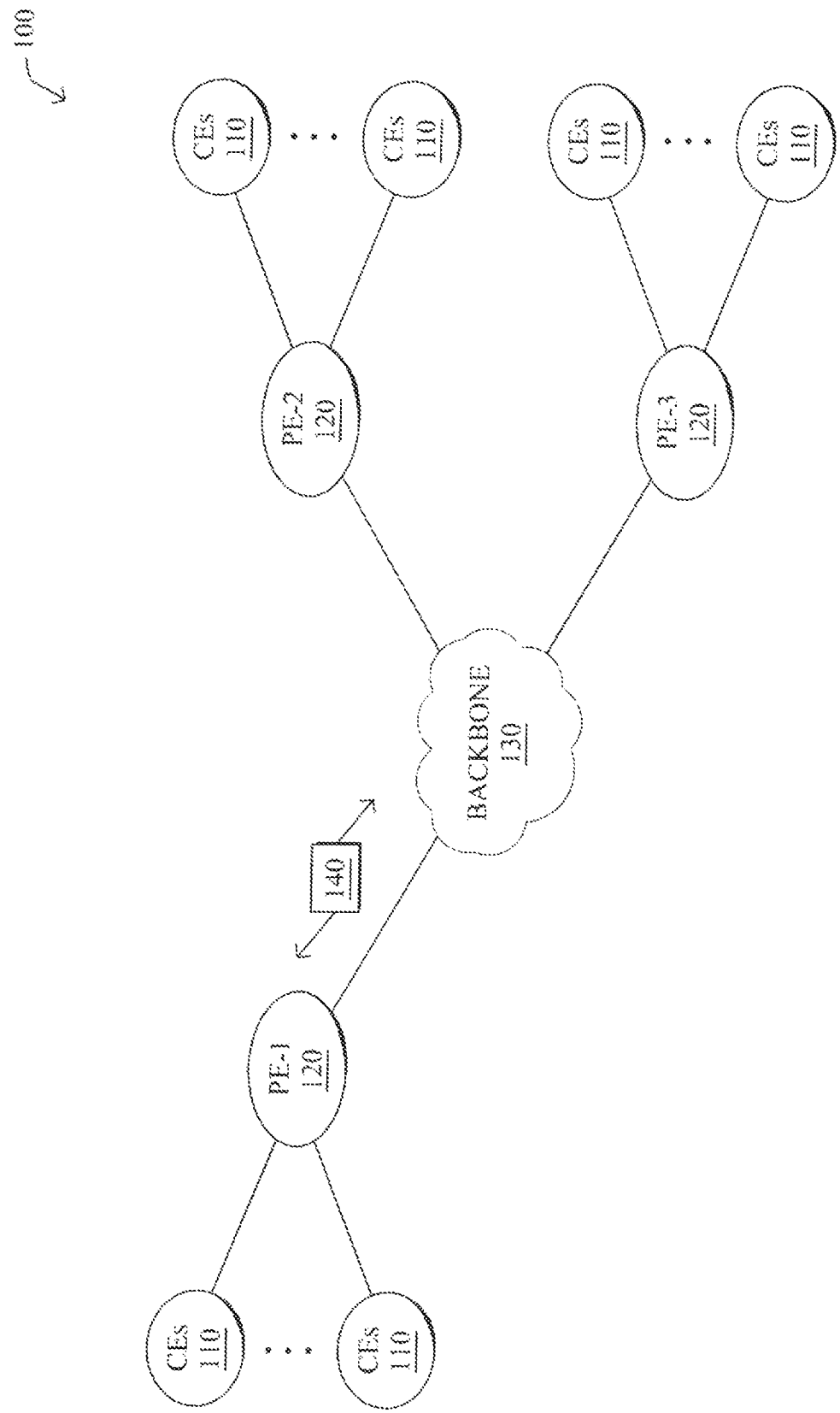
FIGS. 1A-1B illustrate an example communication network.

According to one or more embodiments of the disclosure, a service in a network samples application traffic throughputs for a set of applications present in a network. The service generates a throughput model based on the sampled application throughputs for the set of applications. The service performs anomaly detection on wireless throughput measurements from the network by comparing the wireless throughput measurements to the generated throughput model. The service sends an anomaly detection notification based on a determination that the wireless throughput measurements from the network are anomalous.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing, global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field, area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example; a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
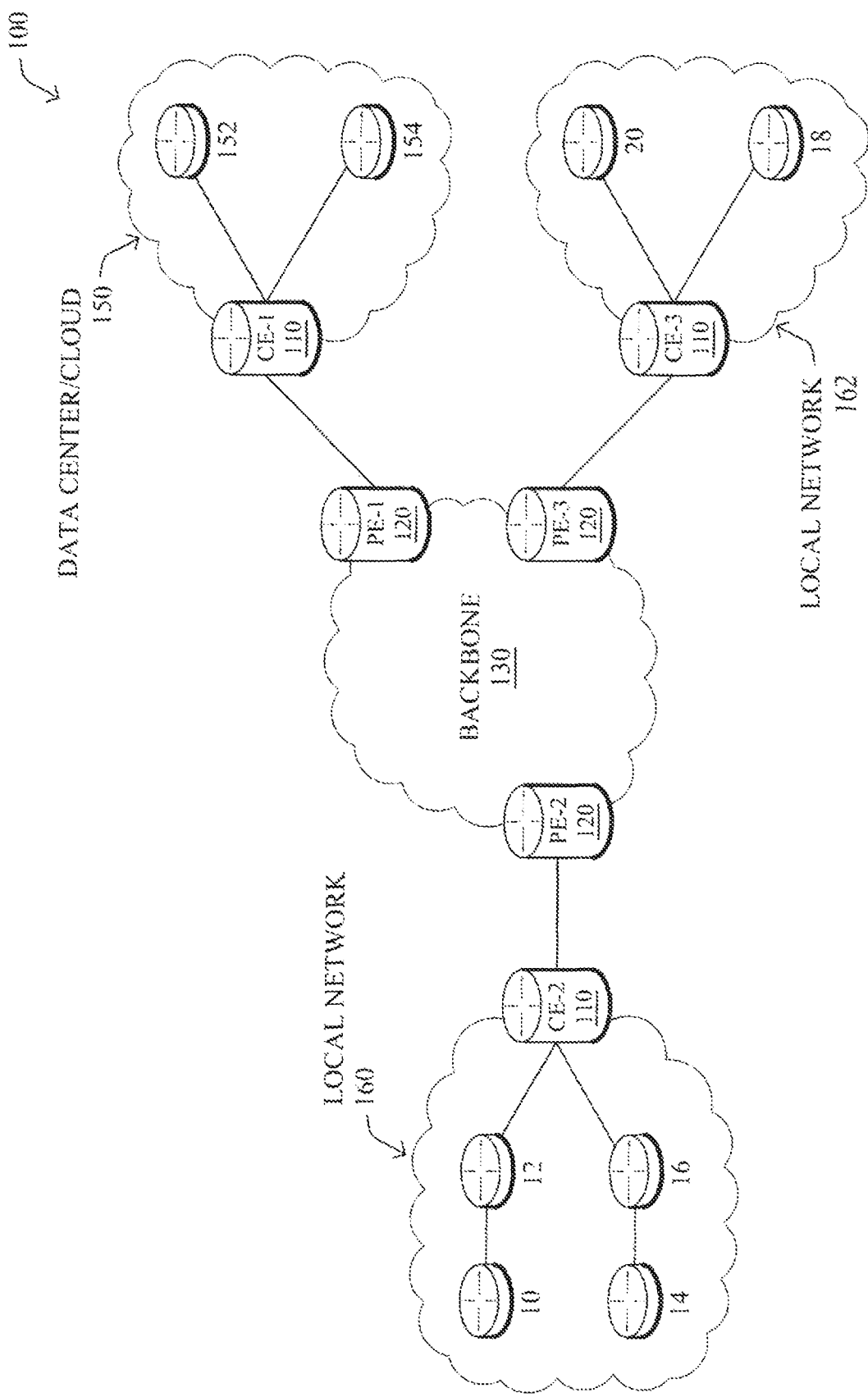

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
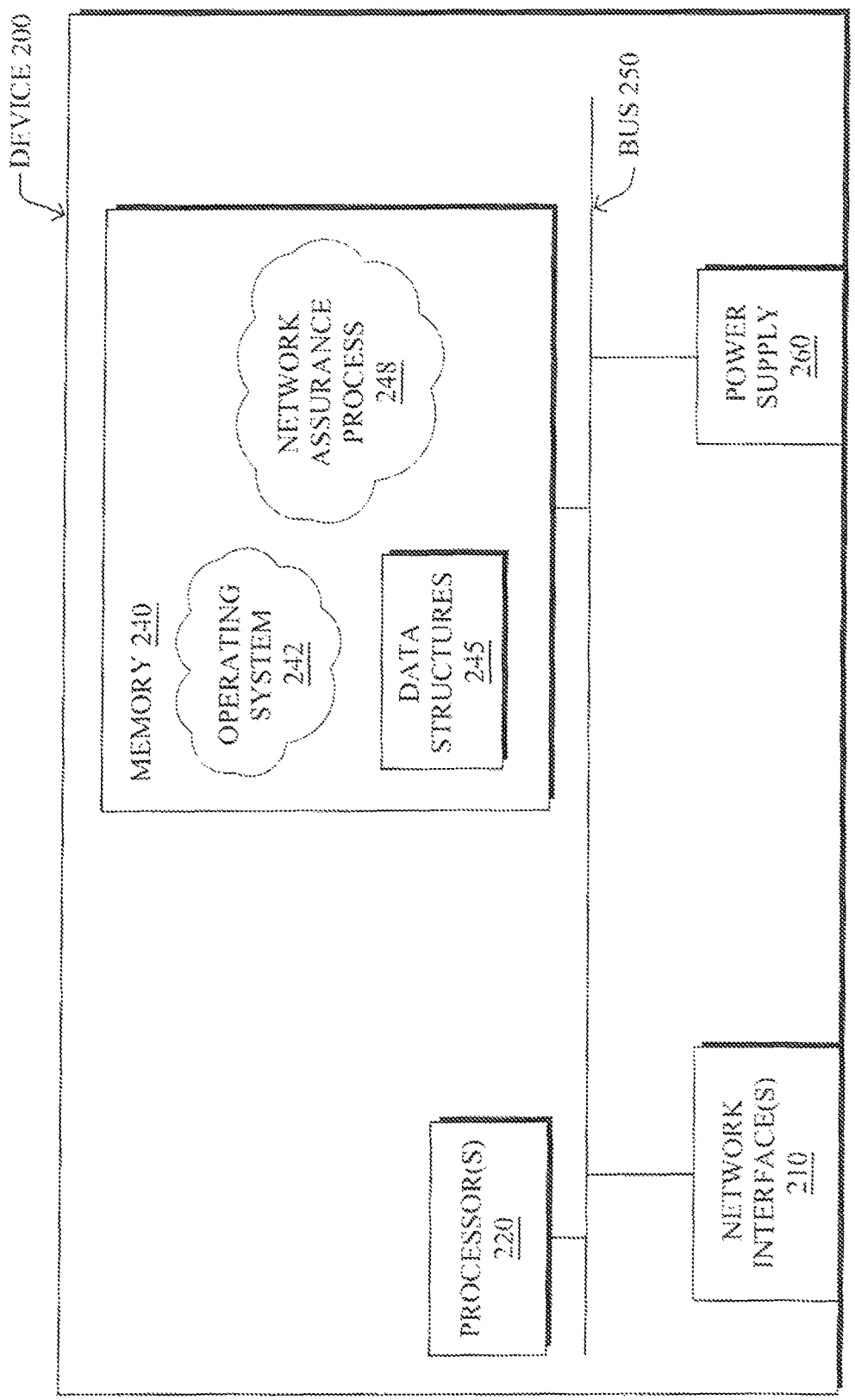
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive, data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a network assurance process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Network assurance process 248 includes computer executable instructions that, when executed by processor(s) 220, cause device 200 to perform network assurance functions as part of a network assurance infrastructure within the network. In general, network assurance refers to the branch of networking concerned with ensuring that the network provides an acceptable level of quality in terms of the user experience. For example, in the case of a user participating in a videoconference, the infrastructure may enforce one or more network policies regarding the videoconference traffic, as well as monitor the state of the network, to ensure that the user does not perceive potential issues in the network (e.g., the video seen by the user freezes, the audio output drops, etc.).

In some embodiments, network assurance process 248 may use any number of predefined health status rules, to enforce policies and to monitor the health of the network, in view of the observed conditions of the network. For example, one rule may be related to maintaining the service usage peak on a weekly and/or daily basis and specify that if the monitored usage variable exceeds more than 10% of the per day peak from the current week AND more than 10% of the last four weekly peaks, an insight alert should be triggered and sent to a user interface.

Another example of a health status rule may involve client transition events in a wireless network. In such cases, whenever there is a failure in any of the transition events, the wireless controller may send a reason_code to the assurance system. To evaluate a rule regarding these conditions, the network assurance system may then group 150 failures into different "buckets" (e.g., Association, Authentication, Mobility, DHCP, WebAuth, Configuration, Infra, Delete, De-Authorization) and continue to increment these counters per service set identifier (SSID), while performing averaging every five minutes and hourly. The system may also maintain a client association request count per SSID every five minutes and hourly, as well. To trigger the rule, the system may evaluate whether the error count in any bucket has exceeded 20% of the total client association request count for one hour.

In various embodiments, network assurance process 248 may also utilize machine learning techniques, to enforce policies and to monitor the health of the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, network assurance process 248 may employ one or more supervised, unsupervised, or semi-supervised machine learning models. Generally, supervised learning entails the use of a training set of data, as noted above, that is used to train the model to apply labels to the input data. For example, the training data may include sample network observations that do, or do not, violate a given network health status rule and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that network assurance process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted whether a network health status rule was violated. Conversely, the false negatives of the model may refer to the number of times the model predicted that a health status rule was not violated when, in fact, the rule was violated. True negatives and positives may refer to the number of times the model correctly predicted whether a rule was violated or not violated, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
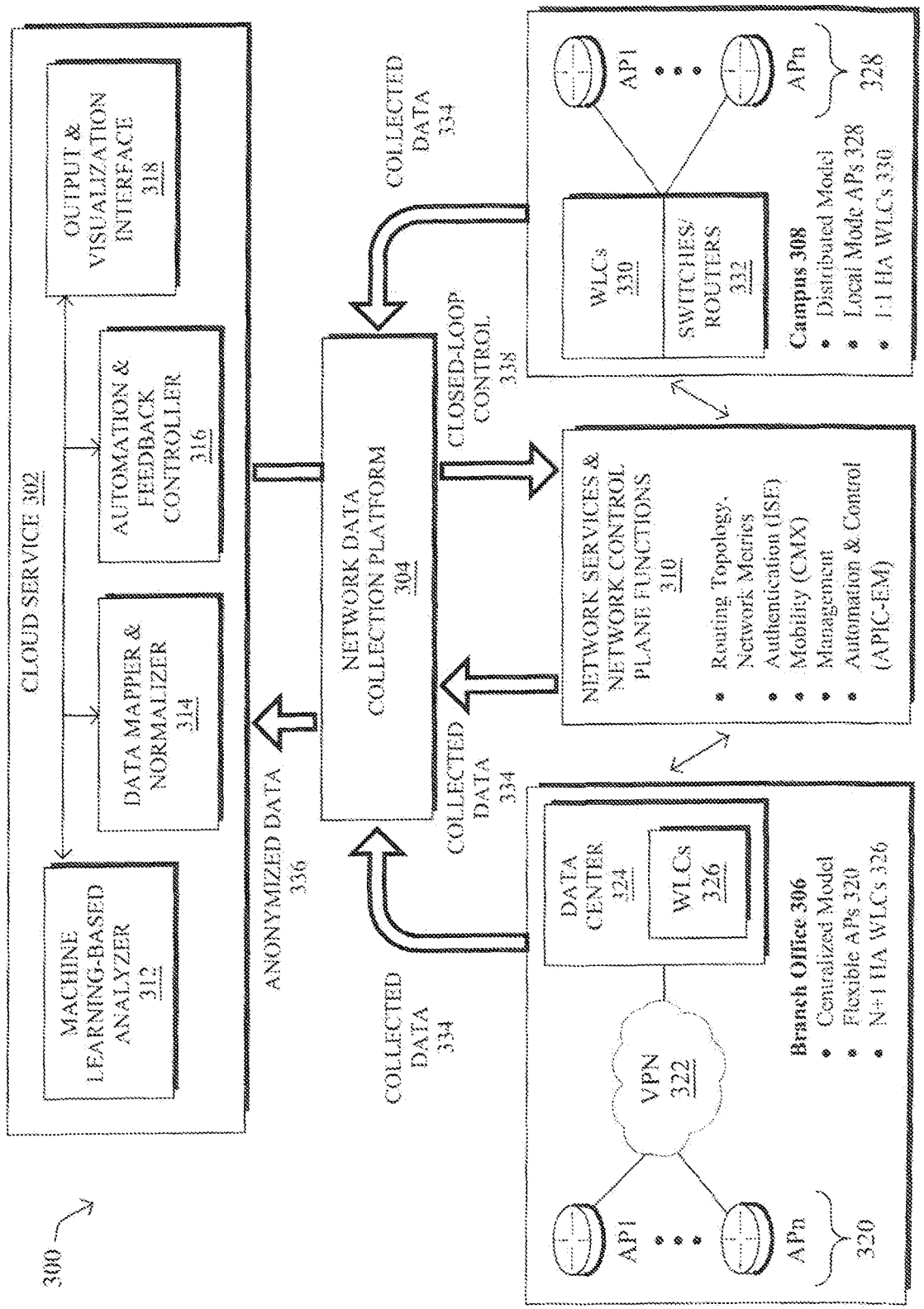
FIG. 3 illustrates an example network assurance system.

FIG. 3 illustrates an example network assurance system 300, according to various embodiments. As shown, at the core of network assurance system 300 may be a cloud service 302 that leverages machine learning in support of cognitive analytics for the network, predictive analytics (e.g., models used to predict user experience, etc.), troubleshooting with root cause analysis, and/or trending analysis for capacity planning. Generally, architecture 300 may support both wireless and wired network, as well as LLNs/IoT networks.

In various embodiments, cloud service 302 may oversee the operations of the network of an entity (e.g., a company, school, etc.) that includes any number of local networks. For example, cloud service 302 may oversee the operations of the local networks of any number of branch offices (e.g., branch office 306) and/or campuses (e.g., campus 308) that may be associated with the entity. Data collection from the various local networks/locations may be performed by a network data collection platform 304 that communicates with both cloud service 302 and the monitored network of the entity.

The network of branch office 306 may include any number of wireless access points 320 (e.g., a first access point AP1 through nth access point, APn) through which endpoint nodes may connect. Access points 320 may, in turn, be in communication with any number of wireless LAN controllers (WLCs) 326 located in a centralized datacenter 324. For example, access points 320 may communicate with WLCs 326 via a VPN 322 and network data collection platform 304 may, in turn, communicate with the devices in datacenter 324 to retrieve the corresponding network feature data from access points 320, WLCs 326, etc. In such a centralized model, access points 320 may be flexible access points and WLCs 326 may be N+1 high availability (HA) WLCs, by way of example.

Conversely, the local network of campus 308 may instead use any number of access points 328 (e.g., a first access point AP1 through nth access point APm) that provide connectivity to endpoint nodes, in a decentralized manner. Notably, instead of maintaining a centralized datacenter, access points 328 may instead be connected to distributed WLCs 330 and switches/routers 332. For example, WLCs 330 may be 1:1 HA WLCs and access points 328 may be local mode access points, in some implementations.

To support the operations of the network, there may be any number of network services and control plane functions 310. For example, functions 310 may include routing topology and network metric collection functions such as, but not limited to, routing protocol exchanges, path computations, monitoring services (e.g., NetFlow or IPFIX exporters), etc. Further examples of functions 310 may include authentication functions, such as by an Identity Services Engine (ISE) or the like, mobility functions such as by a Connected Mobile Experiences (CMX) function or the like, management functions, and/or automation and control functions such as by an APIC-Enterprise Manager (APIC-EM).

During operation, network data collection platform 304 may receive a variety of data feeds that convey collected data 334 from the devices of branch office 306 and campus 308, as well as from network services and network control plane functions 310. Example data feeds may comprise, but are not limited to, management information bases (MIBS) with Simple Network Management Protocol (SNMP)v2, JavaScript Object Notation (JSON) Files (e.g., WSA wireless, etc.), NetFlow/IPFIX records, logs reporting in order to collect rich datasets related to network control planes (e.g., Wi-Fi roaming, join and authentication, routing, QoS, PHY/MAC counters, links/node failures), traffic characteristics, and the like. As would be appreciated, network data collection platform 304 may receive collected data 334 on a push and/or pull basis, as desired. Network data collection platform 304 may prepare and store the collected data 334 for processing by cloud service 302. In some cases, network data collection platform may also anonymize collected data 334 before providing the anonymized data 336 to cloud service 302.

In some cases, cloud service 302 may include a data mapper and normalizer 314 that receives the collected and/or anonymized data 336 from network data collection platform 304. In turn, data mapper and normalizer 314 may map and normalize the received data into a unified data model for further processing by cloud service 302. For example, data mapper and normalizer 314 may extract certain data features from data 336 for input and analysis by cloud service 302.

In various embodiments, cloud service 302 may include a machine learning-based analyzer 312 configured to analyze the mapped and normalized data from data mapper and normalizer 314. Generally, analyzer 312 may comprise a power machine learning-based engine that is able to understand the dynamics of the monitored network, as well as to predict behaviors and user experiences, thereby allowing cloud service 302 to identify and remediate potential network issues before they happen.

Machine learning-based analyzer 312 may include any number of machine learning models to perform the techniques herein, such as for cognitive analytics, predictive analysis, and/or trending analytics as follows:

Cognitive Analytics Model(s): The aim of cognitive analytics is to find behavioral patterns in complex and unstructured datasets. For the sake of illustration, analyzer 312 may be able to extract patterns of Wi-Fi roaming in the network and roaming behaviors (e.g., the "stickiness" of clients to APs 320, 328, "ping-pong" clients, the number of visited APs 320, 328, roaming triggers, etc). Analyzer 312 may characterize such patterns by the nature of the device (e.g., device type, OS) according to the place in the network, time of day, routing topology, type of AP/WLC, etc., and potentially correlated with other network metrics (e.g., application, QoS, etc.). In another example, the cognitive analytics model(s) may be configured to extract AP/WLC related patterns such as the number of clients, traffic throughput as a function of time, number of roaming processed, or the like, or even end-device related patterns (e.g., roaming patterns of iPhones, IoT Healthcare devices, etc.).

Predictive Analytics Model(s): These model(s) may be configured to predict user experiences, which is a significant paradigm shift from reactive approaches to network health. For example, in a Wi-Fi network, analyzer 312 may be configured to build predictive models for the joining/roaming time by taking into account a large plurality of parameters/observations (e.g., RF variables, time of day, number of clients, traffic load, DHCP/DNS/Radius time, AP/WLC loads, etc.). From this, analyzer 312 can detect potential network issues before they happen. Furthermore, should abnormal joining time be predicted by analyzer 312, cloud service 312 will be able to identify the major root cause of this predicted condition, thus allowing cloud service 302 to remedy the situation before it occurs. The predictive analytics model(s) of analyzer 312 may also be able to predict other metrics such as the expected throughput for a client using a specific application. In yet another example, the predictive analytics model(s) may predict the user experience for voice/video quality using network variables (e.g., a predicted user rating of 1-5 stars for a given session, etc.), as function of the network state. As would be appreciated, this approach may be far superior to traditional approaches that rely on a mean opinion score (MOS). In contrast, cloud service 302 may use the predicted user experiences from analyzer 312 to provide information to a network administrator or architect in real-time and enable closed loop control over the network by cloud service 302, accordingly. For example, cloud service 302 may signal to a particular type of endpoint node in branch office 306 or campus 308 (e.g., an iPhone, an IoT healthcare device, etc.) that better QoS will be achieved if the device switches to a different AP 320 or 328.

Trending Analytics Model(s): The trending analytics model(s) may include multivariate models that can predict future states of the network, thus separating noise from actual network trends. Such predictions can be used, for example, for purposes of capacity planning and other "what-if" scenarios.

Machine learning-based analyzer 312 may be specifically tailored for use cases in which machine learning is the only viable approach due to the high dimensionality of the dataset and patterns cannot otherwise be understood and learned. For example, finding a pattern so as to predict the actual user experience of a video call, while taking into account the nature of the application, video CODEC parameters, the states of the network (e.g., data rate, RF, etc.), the current observed load on the network, destination being reached, etc., is simply impossible using predefined rules in a rule-based system.

Unfortunately, there is no one-size-fits-all machine learning methodology that is capable of solving all, or even most, use cases. In the field of machine learning, this is referred to as the "No Free Lunch" theorem. Accordingly, analyzer 312 may rely on a set of machine learning processes that work in conjunction with one another and, when assembled, operate as a multi-layered kernel. This allows network assurance system 300 to operate in real-time and constantly learn and adapt to new network conditions and traffic characteristics. In other words, not only can system 300 compute complex patterns in highly dimensional spaces for prediction or behavioral analysis, but system 300 may constantly evolve according to the captured data/observations from the network.

Cloud service 302 may also include output and visualization interface 318 configured to provide sensory data to a network administrator or other user via one or more user interface devices (e.g., an electronic display, a keypad, a speaker, etc.). For example, interface 318 may present data indicative of the state of the monitored network, current or predicted issues in the network (e.g., the violation of a defined rule, etc.), insights or suggestions regarding a given condition or issue in the network, etc. Cloud service 302 may also receive input parameters from the user via interface 318 that control the operation of system 300 and/or the monitored network itself. For example, interface 318 may receive an instruction or other indication to adjust/retrain one of the models of analyzer 312 from interface 318 (e.g., the user deems an alert/rule violation as a false positive).

In various embodiments, cloud service 302 may further include an automation and feedback controller 316 that provides closed-loop control instructions 338 back to the various devices in the monitored network. For example, based on the predictions by analyzer 312, the evaluation of any predefined health status rules by cloud service 302, and/or input from an administrator or other user via input 318, controller 316 may instruct an endpoint device, networking device in branch office 306 or campus 308, or a network service or control plane function 310, to adjust its operations (e.g., by signaling an endpoint to use a particular AP 320 or 328, etc.).

As noted above, detecting and forecasting throughput issues is a critical functionality in a network assurance system, for both wired and wireless networks. Lack of sufficient throughput is the root cause for many application malfunctions (e.g., low quality in audio and video stream, unresponsive remote desktops, etc.). In many cases, the assurance system may monitor the network quality of service based on a set of networking variables (e.g., performance metrics regarding the wireless APs or other networking devices, themselves). However, in some circumstances, networking issues may not lead to application performance degradation and conversely the service level agreement (SLA) on a given application may be impacted by a series of networking issues that are difficult to detect either collectively or individually.

The throughput available to an end-user (e.g., through a wireless AP, etc.) is crucial to determining the quality of their experience on the network. In turn, from the network administrator's point of view, monitoring throughput in real-time, as well as being able to understand how and why there might be periods of unexpected low throughput, is critical to their ability to take corrective action. Armed with historical insights into the behavior of throughput on a wireless network, a network administrator can take preventative action to ensure the smooth functioning of the wireless network during business-critical situations. Additionally, the availability of some insight into the future behavior of throughput would be invaluable in dealing with emergent issues.

While the benefits of understanding throughput are varied and clear, understanding throughput is not always so straightforward and can be fairly intractable when treated holistically. In some embodiments, wireless throughput anomalies can be detected using regression to model wireless throughput by considering underlying application throughput and including network effects. However, throughput distributions for wireless and application-based distributions are peaked at very low (near zero) Mbps, with long tails in the high throughput region. The low throughput region is noisy, challenging to understand, and also does not have much impact on the end user.

Wireless Throughput Issue Detection Using Coarsely Sampled Application Activity

The techniques herein allow wireless throughput anomalies to be detected by accurately modeling the underlying behaviors of the applications in the network (e.g., their application traffic). This represents a fundamental shift from other approaches to detecting wireless network throughput anomalies and is agnostic to the root cause is the wireless network itself. Instead, wireless throughput anomalies may be detected based entirely on the activity pattern observed on the wireless link in question, as determined by the application usage of its clients. In some aspects, the techniques herein are statistical in nature, and provide a robust measurement of expected throughput as well as a confidence interval for each observed throughput reading. The confidence measure can provide the network administrator with useful insight into the typical behavior of the network, empowering them to respond well to unexpected situations. In further aspects, the techniques herein can be generalized and used to focus on a subset of applications (e.g. video applications, enterprise business applications, etc.), or even a single application. In view of the fact that throughput issues can affect business efficiency and an end user's experience on a wireless network, the approaches herein provide valuable insight and control over throughput behavior and related issues in the wireless network.

Specifically, according to one or more embodiments of the disclosure as described in detail below, a service in a network samples application traffic throughputs for a set of applications present in a network. The service generates a throughput model based on the sampled application throughputs for the set of applications. The service performs anomaly detection on wireless throughput measurements from the network by comparing the wireless throughput measurements to the generated throughput model. The service sends an anomaly detection notification based on a determination that the wireless throughput measurements from the network are anomalous.

Illustratively, the techniques described herein may be performed by hardware, software, and/or firmware, such as in accordance with the network assurance process 248, which may include computer executable instructions executed by the processor 220 (or independent processor of interfaces 210) to perform functions relating to the techniques described herein.

Operationally, The techniques described herein focus on detecting anomalies in application-based and overall throughput by way of understanding and modelling the underlying behavior of the applications that are actively transmitting data on the network. In a typical network, there are several clients connected to a wireless access point at any given time, and each client exchanges data communications with the network for each of several applications that may be active on their device. For example, a casual wireless user may typically browse the Internet, check email, and also listen to online streaming music or watch online videos, concurrently. In another example, a business user might utilize enterprise applications for email, video conferencing and VPN for conducting day-to-day work, while simultaneously streaming music in the background.

Figure 4:
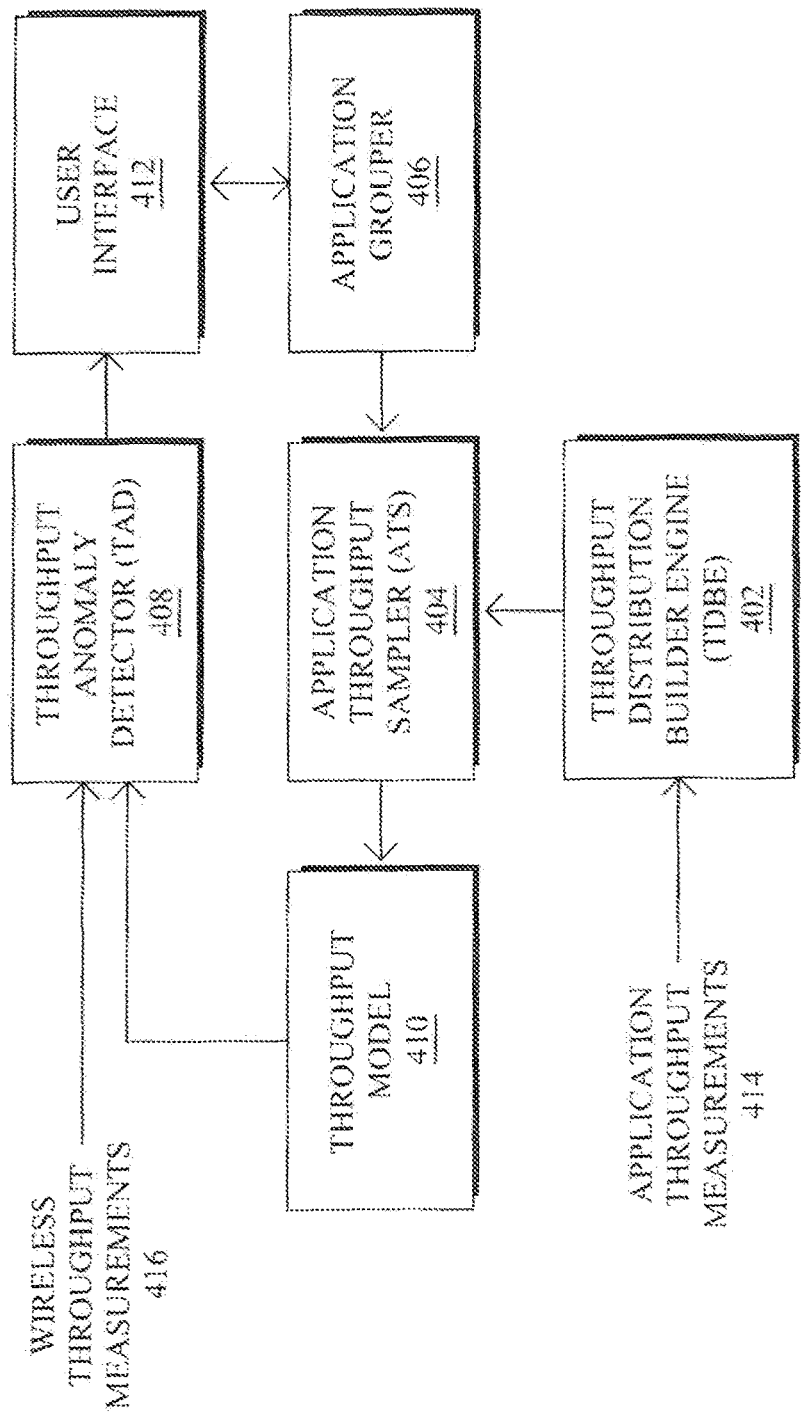
FIG. 4 illustrates an example architecture for detecting wireless throughput anomalies.
Figure 5A:
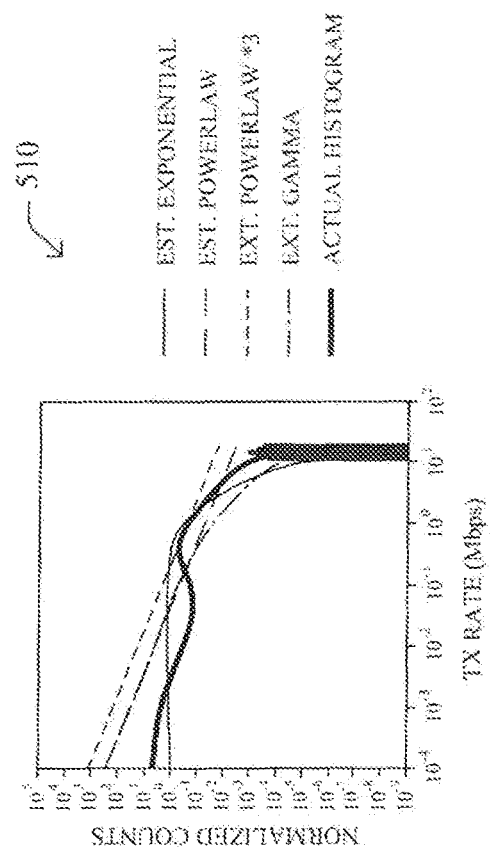
FIGS. 5A-5D illustrate examples of application-specific throughput distributions.
Figure 5B:
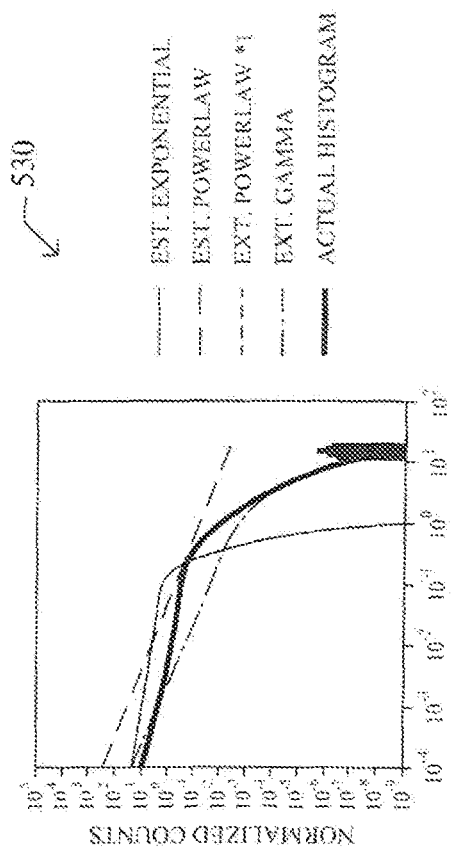
Figure 5C:
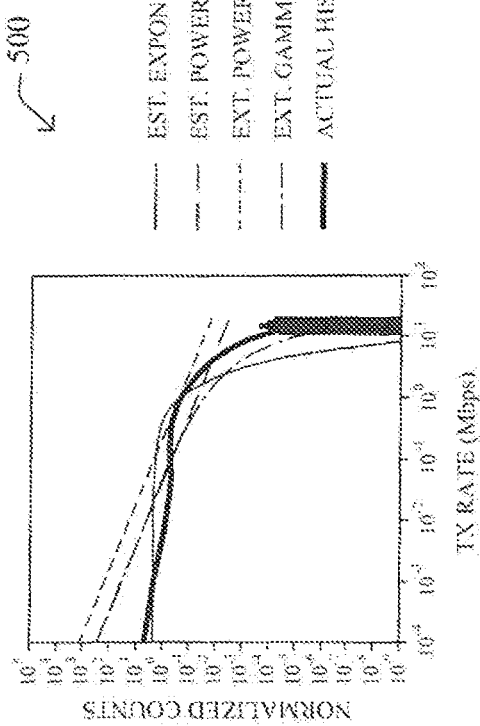
Figure 5D:
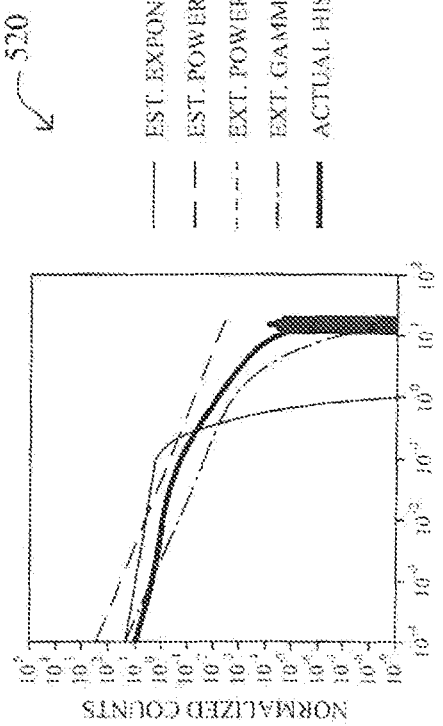

FIG. 4 illustrates an example architecture for detecting wireless throughput anomalies, according to various embodiments. In general, architecture 400 may include any or all of the following components: a throughput distribution builder engine (TDBE) 402, an application throughput sampler (ATS) 404, an application grouper 406, and/or a throughput anomaly detector 408. In various embodiments, the components of architecture 400 may be implemented within a network assurance system, such as system 300 shown in FIG. 3. Accordingly, the components 402-408 of architecture 400 shown may be implemented as part of cloud service 302, as part of network data collection platform 304, and/or on one or more network elements/data sources within the monitored network itself. For example, throughput anomaly detector 408 may be implemented as part of machine learning-based analyzer 312, in some embodiments. Further, these components may be implemented in a distributed manner or implemented as its own stand-alone service, either as part of the local network under observation or as a remote service. In addition, the functionalities of the components of architecture 400 may be combined, omitted, or implemented as part of other processes, as desired.

A first aspect of the techniques herein is the throughput distribution builder engine (TDBE) 402, which is configured to obtain throughput data points for any or all applications present in the network, to construct application throughput time series (e.g., on a per-application basis). For example, as shown, TDBE 402 may obtain application throughput measurements 414, either on a push or pull basis and at predefined intervals (e.g., every 5 minutes or any other suitable time interval). In various embodiments, the application throughput measurements 414 may be on a per-application basis leveraging an application recognition technology such as Application Visibility and Control (AVC) from Cisco System, Inc., Network Based Application Recognition (NBAR) from Cisco System, Inc., or any other traffic analysis mechanism able to distinguish between different application traffic types.

From the application throughput time series, TDBE 402 may construct separate, discretized probability distribution functions (PDFs) (e.g., normalized histograms) of observed application throughputs, which describe the probability of an application having a specific throughput value. These distributions are typically sharply peaked at low throughput and have very long tails, indicating that the application throughput time series comprises several readings of low throughput with few high throughput observations. These histograms can be stored in-memory or locally on disk, for later use, in various implementations.

FIGS. 5A-5D illustrate examples of application-specific throughput distributions, such as those that may be generated by TDBE 402. In particular, throughput distribution 500 and 510 illustrate example distributions of the throughputs observed for different video streaming applications (e.g., applications A and B). Throughput distribution 520 illustrates an example distribution of the observed throughputs for secure socket layer (SSL) traffic in the network. Finally, throughput distribution 530 illustrates an example distribution of observed throughputs for a social networking application observed in the network. Note that a logarithmic scale is used in distributions 500-530 and how most of the probability mass resides in areas where the throughput is small.

Referring again to FIG. 4, TDBE 402 may also compute what is referred to as the total application throughput, which is the sum of the throughputs of the applications observed in the network. Notably, TDBE 402 may compute a discretized density function (e.g., PDF) of the total application throughput using any suitable sampling period, such as every 30 minutes, any other sampling period at a coarser time granularity than that of the individual applications, or the like.

In various embodiments, architecture 400 may include application throughput sampler (ATS) 404, which is configured to model the total expected throughput. In particular, ATS 404 may receive the outputs of TDBE 402 and use this information to determine the probability of occurrence of each application throughput reading. In other words, ATS 404 may determine, for each of the set of applications, a probability of application traffic for the application occurring in the network. ATS 404 may do so by obtaining samples of throughput measurements for each underlying application under scrutiny, in proportion to their observed activity in the network. In turn, ATS 404 may sum these samples to obtain a total throughput value. By performing this step many times, ATS 404 can generate a representative distribution of the total throughput, given a certain activity pattern. Such a distribution can then be used as throughput model 410. This key step involves the sampling of total throughput based on the underlying application distribution. Note that ATS 404 can sample the total throughput based on the underlying application distribution in any number of ways.

By way of example of the operation of ATS 404, consider a time interval of 30 minutes during which a total throughput of 543 Kbps has been observed. Assume there are two applications, App A and App B, that are active during this interval. App A and App B have readings every 5 minutes, and will typically have multiple readings within a 30-minute interval (one reading for App A has 5 and App B has 3 readings, as depicted in the plot 600 in FIG. 6.

Figure 6:
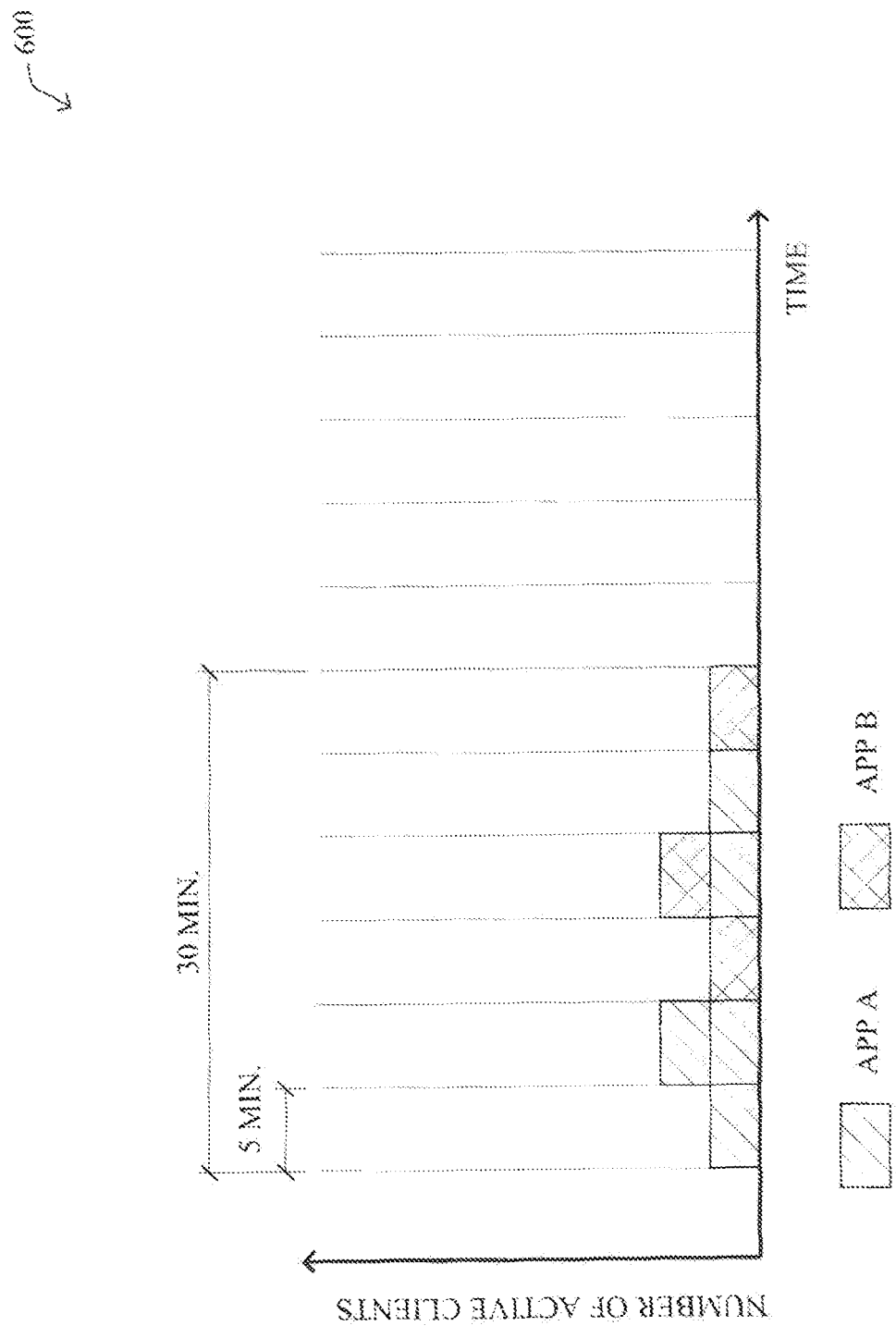
FIG. 6 illustrates an example of application-specific network activity.
Figure 7:
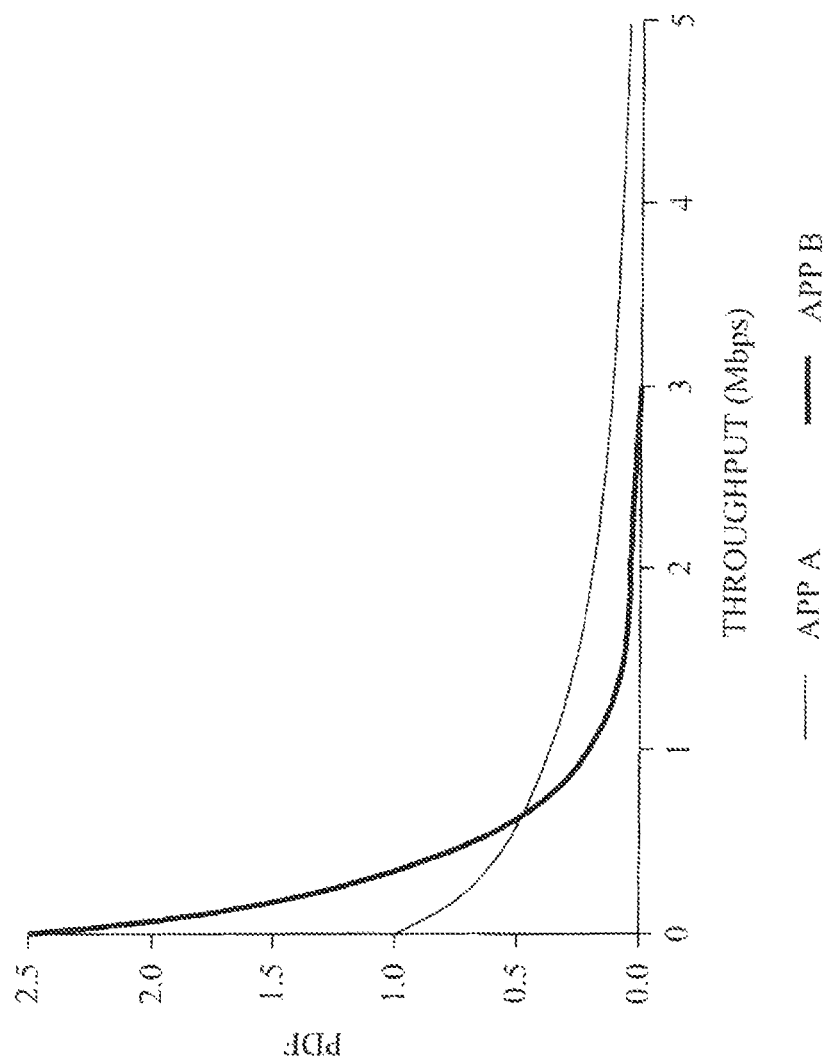
FIG. 7 illustrates example throughput distributions for two applications.

The total throughput for the application activity illustrated in FIG. 6 can be simulated by repeatedly sampling and summing sets of points from App A and App B. Various techniques can be used for sampling such as, but not limited to, inverse transform sampling, rejection sampling, or other Monte Carlo techniques. In addition, a convolution of the PDFs of the underlying application distributions yields the same result as well. For example, plot 700 in FIG. 7 illustrates the PDFs of both App A and App B, which corresponds to the observance of five App A readings and three App B readings shown in FIG. 6.

In various embodiments, architecture 400 may include an application grouper 406 configured to dynamically determine how applications should be grouped together for purposes of the wireless throughput anomaly detection. In a simple embodiment, application grouper 406 may simply select all applications observed in the network for modeling by ATS 404. In another embodiment, application grouper may select only the top n-number of most active applications in the network (e.g., based on their application traffic). For example, model 410 may be formed using only throughput information from the top ten most active applications in the network. In another embodiment, application grouper 406 may select the applications based on a user selection of the set of applications received from a user interface 412. For example, a network administrator operating a remote interface to the network assurance service may specify only those applications of interest, driven by the criticality of each application (e.g., the user may not want to selectively choose the set of applications considered by the ATS according to a policy driven approach. In yet another embodiment, application grouper 406 may selectively determine the set of applications of interest using user feedback from user interface 412 based on the relevancy of the appropriate anomaly. For example, in response to an anomaly detection notification sent to user interface 412, the user may provide feedback to the system highlighting how relevant the user considers the anomaly to be. Such a scoring system may be used by application grouper 406 to specifically include/exclude applications from the model 410 built by ATS 404.

In another embodiment, multiple models can be used by application grouper 406, according to a set of one or more device types associated with the applications. For example, video throughputs can be expected to differ between smartphones and laptops. Conversely, video throughputs can be expected to be quite similar across different makes or manufacturers of smartphones. The system may then decide to split or merge histograms based on similarity metrics between them (e.g., a Kolmogorov-Smirnov distance, etc.).

Another potential component of architecture 400 is throughput anomaly detector (TAD) 408, which encodes the logic to classify an observed wireless throughput measurement 416 as anomalous, based on its distance from the sampled distribution obtained from ATS 404 (e.g., throughput model 410). In particular an anomaly detection threshold (e.g., a distance metric) can be defined to compare the observed application throughput with the wireless throughput distribution obtained above. TAD 408 may deem a wireless throughput measurement 416 as anomalous if the corresponding distance metric lies above the pre-determined anomaly threshold.

Figure 8:
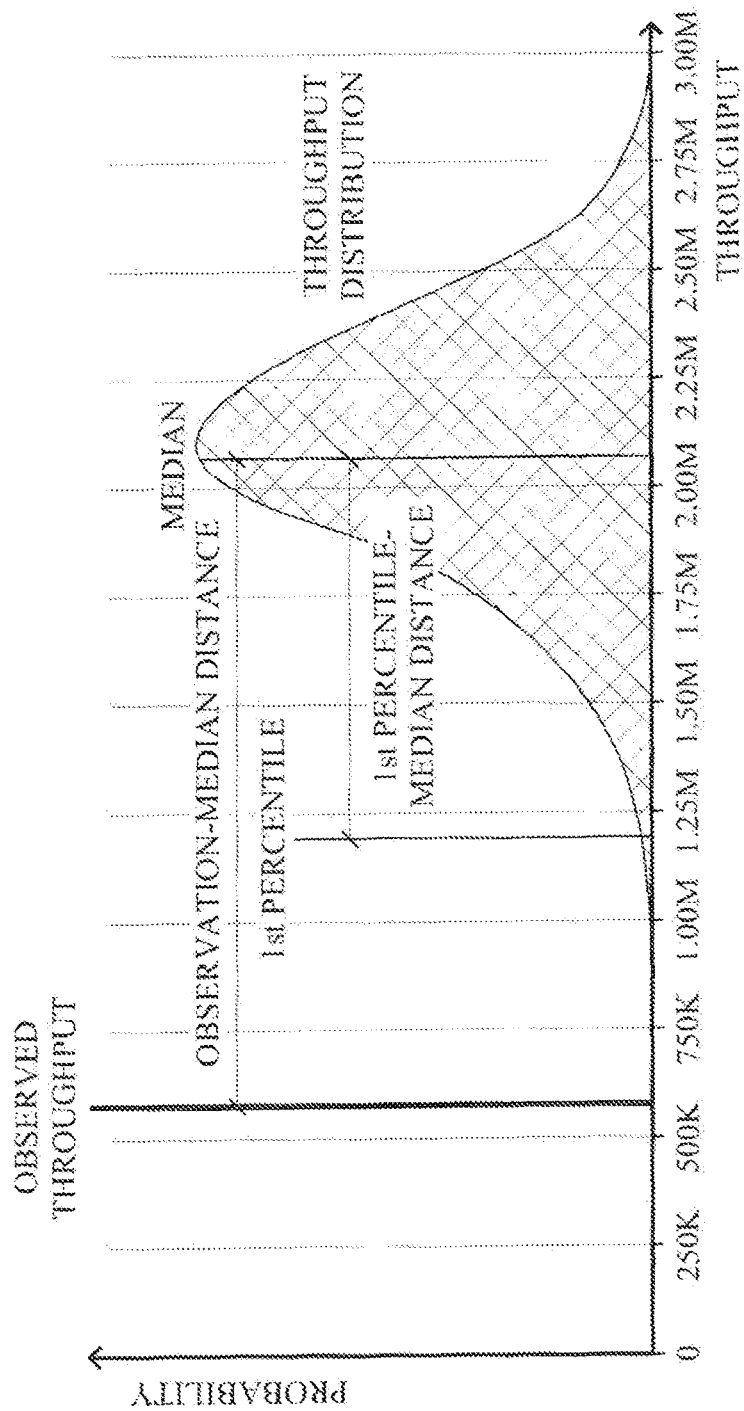
FIG. 8 illustrates an example of wireless throughput anomaly detection.

For example, if an observed wireless throughput measurement 416 lies outside of the $1^{st}$ percentile of the throughput distribution, then TAD 408 may classify that point as anomalous. In other words, as shown in plot 800 in FIG. 8, by comparing the observed wireless throughput with the simulated distributions, it is possible to determine how far off the observation lies with respect to the underlying distributions. Note that the distribution shown in FIG. 8 may be computed by summing the individual application throughput distributions. If the observed wireless throughput measurement 416 is far off from the simulated distribution, based on a pre-defined distance metric, the wireless throughput, given the observed set of active applications, is considered anomalous.

In yet another embodiment, any signal from an application indicative of performance degradation may be used by TAD 408, to dynamically set such a threshold. For example, if a WLC/AP is equipped with Deep Packet Inspection (DPI), it may become possible to detect in-band signal indicative of performance degradation (e.g. dynamic encoding change from a CODEC, TCP back-off, MAC layer retransmission). If such a signal is detected, the WLC/AP may send a signal to architecture 400 which, in turn, may adjust the threshold dynamically (e.g., shortening the distance from the median to raise an anomaly in presence of such a signal).

Figures 9A, 9B, 9C:
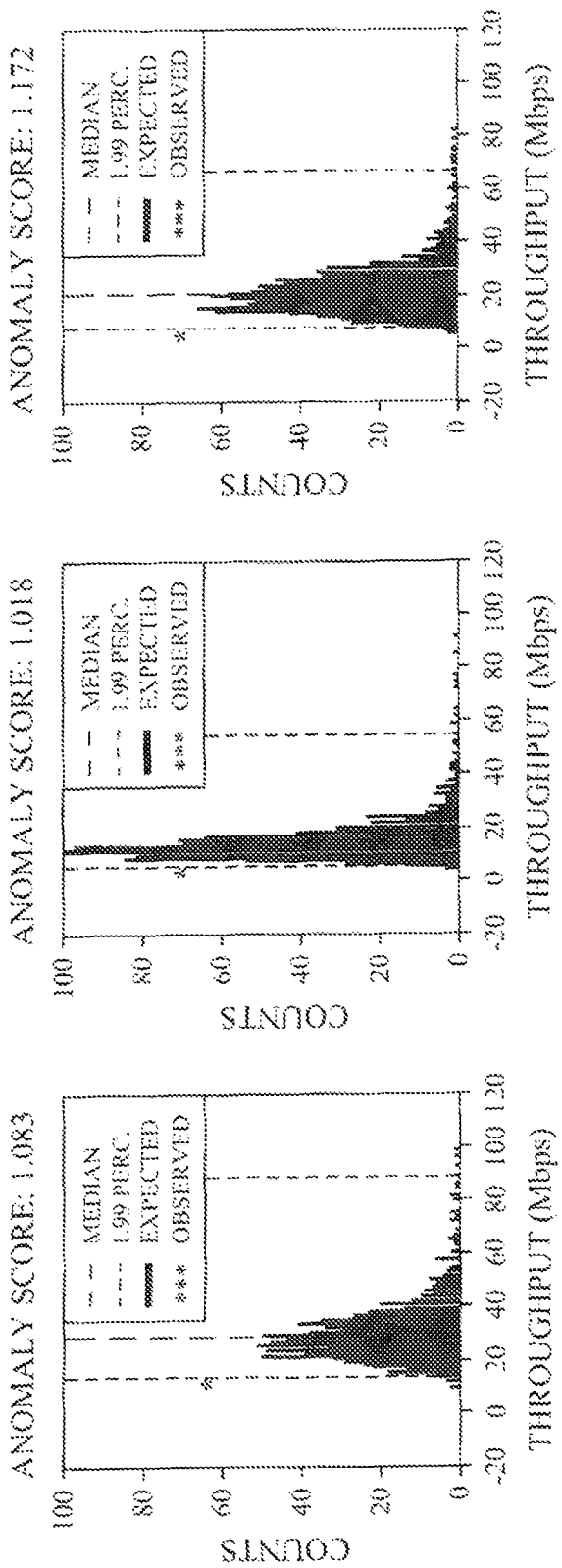
FIGS. 9A-9C illustrates example anomaly scores for wireless throughput.

Preliminary testing has indicated that TAD 408 can process data and detect anomalies fairly quickly, in a live environment. Notably, a prototype has been constructed on a small distributed system (10 nodes with 32 GB of RAM) and can typically analyze six months of data for an AP in about 1 second. Additional speed optimizations will reduce the run time further. FIGS. 9A-9C illustrates example anomaly scores 900-910 for wireless throughputs assessed using the prototype system. During testing, an observed wireless throughput measurement was deemed anomalous if it lies below the percentile of the expected throughput (e.g., the distribution formed from the individual application throughputs). Notably, the top ten applications that were the most active in the network were used to form the expected throughput model.

Figure 10:
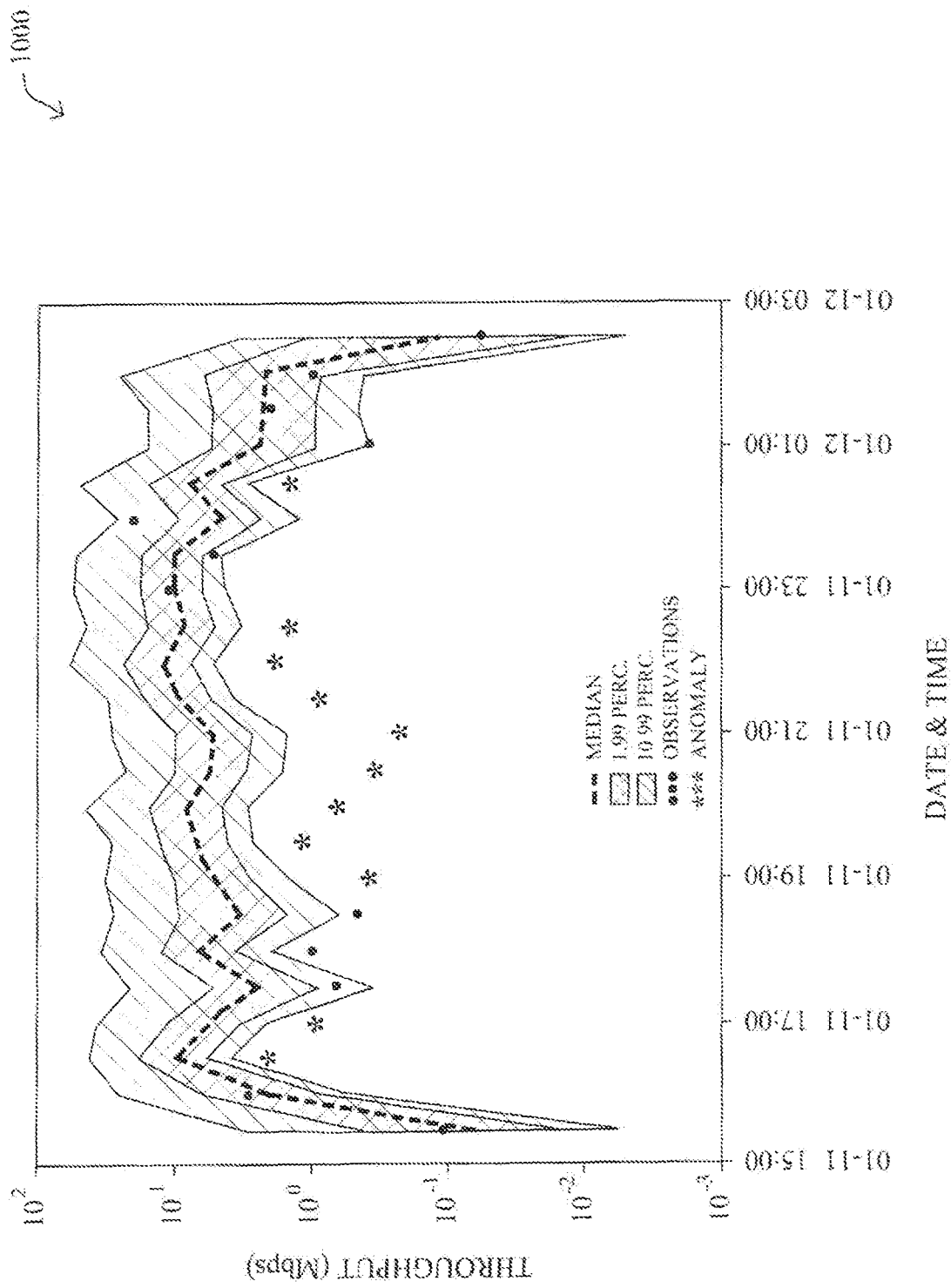
FIG. 10 illustrates an example of throughput anomalies over time.

When TAD 408 detects a wireless throughput anomaly, it may send an anomaly detection notification to user interface 412 shown in FIG. 4 and/or to any other system or user that may initiate corrective measures. For example, a wireless throughput anomaly detection notification may trigger configuration changes at a WLC or AP, to correct for this condition. For example, FIG. 10 illustrates a plot 1000 indicating a period of unexpected, low wireless throughput. Such information could be used by an administrator to adjust network configurations, initiate equipment repairs or replacements, or the like.

Figure 11:
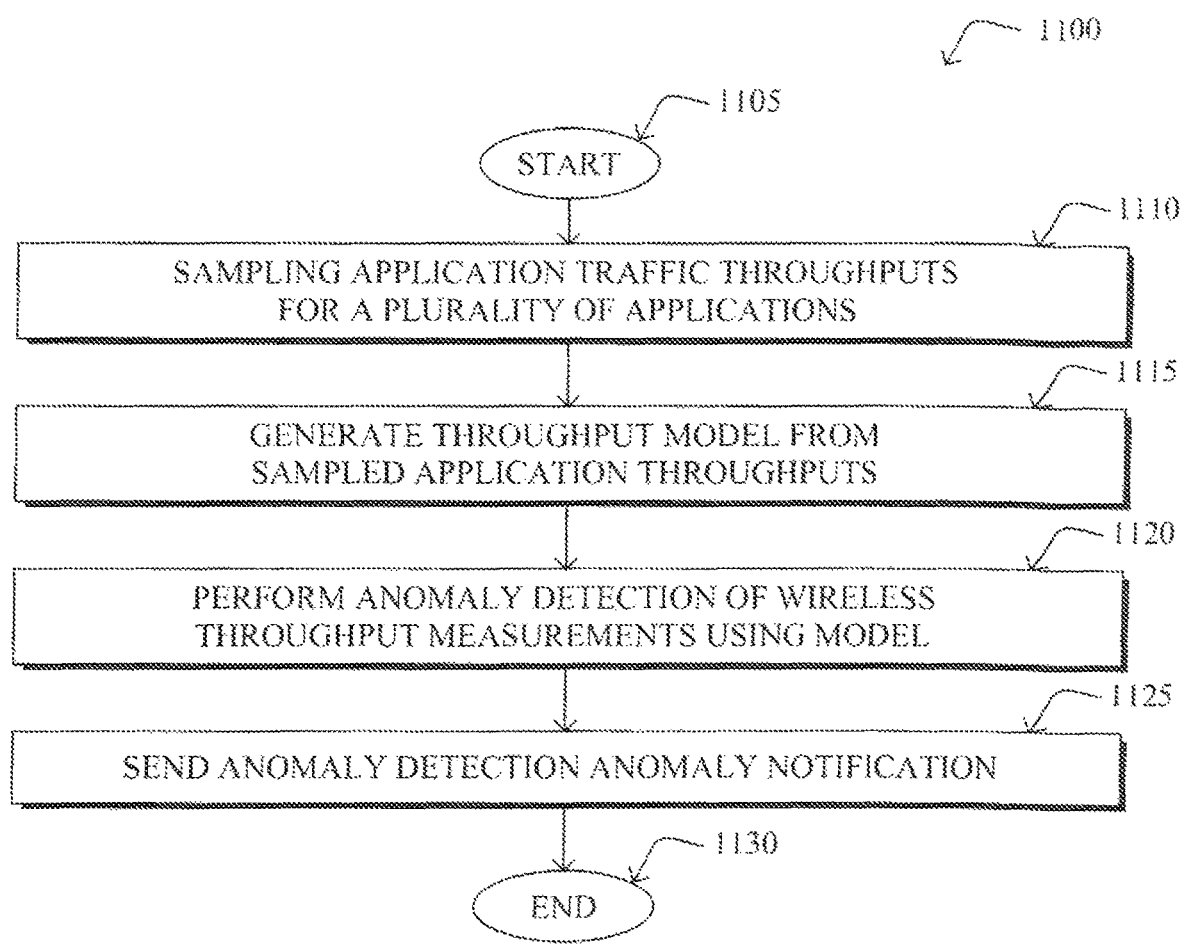
FIG. 11 illustrates an example simplified procedure for detecting a wireless throughput anomaly in a network.

FIG. 11 illustrates an example simplified procedure for detecting a wireless throughput anomaly in a network, in accordance with one or more embodiments described herein. For example, a non-generic, specifically configured device (e.g., device 200) may perform procedure 1100 by executing stored instructions (e.g., process 248), to provide a network assurance service. The procedure 1100 may start at step 1105, and continues to step 1110, where, as described in greater detail above, the service may sample application traffic throughputs for a set of applications present in a network. For example, the service may leverage a traffic monitoring mechanism that can discern between traffic flows of different applications (e.g., conferencing, video streaming, encrypted web traffic, unencrypted web traffic, social networking, etc.), to sample the application traffic throughputs in the network.

At step 1115, as detailed above, the service may generate a throughput model based on the sampled application throughputs for the set of applications. In various embodiments, the service may use the sampled application throughputs to form time series of the application throughputs. From these, the service may form a distribution function for the total application throughput (e.g., for a certain time period). In some cases, the service may also adjust or select which of the applications are used to form the model, such as based on user selection, by selecting the top n-number of applications, based on feedback regarding a detected anomaly, etc.

At step 1120, the service may perform anomaly detection on wireless throughput measurements, as described in greater detail above. In various embodiments, the service may do so by comparing the wireless throughput measurements to the generated throughput model. For example, if the wireless throughput measurement is outside of a predefined anomaly threshold (e.g., one standard deviation or greater) from the throughput model (e.g., a distribution function), the service may deem the wireless throughput measurement as anomalous.

At step 1125, as detailed above, the service may send an anomaly detection notification based on a determination that the wireless throughput measurements from the network are anomalous. For example, the service may send the notification to a user interface (e.g., via the network or to a local interface), to alert a network administrator as to the wireless throughput anomaly. In another embodiment, the service may send the notification to another service that can use the notification to automatically adjust the configuration of the network (e.g., by adjusting the number of clients that may be attached to an AP, etc.). Procedure 1100 then ends at step 1130.

It should be noted that while certain steps within procedure 1100 may be optional as described above, the steps shown in FIG. 11 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the detection of throughput issues, even in absence of very fine-grained sampling of the application throughput.

While there have been shown and described illustrative embodiments that provide for detecting wireless throughput issues in a network, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, such as BGP, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
sampling, by a service, application traffic throughputs for a set of applications present in a network;
generating, by the service, application throughput distributions for the set of applications based on the sampled application throughputs, wherein the application throughput distributions are indicative a probability of an application having a specific throughput value;
generating, by the service, a throughput model based on the sampled application throughputs, wherein the throughput model is indicative of a probability of application traffic for the set of applications occurring in the network, wherein the sampled application throughputs comprise a number of application throughput samples, for each application of the set of applications, that are obtained based on the application throughput distributions;

performing, by the service, anomaly detection on wireless throughput measurements from the network to determine whether throughput associated with a particular application of the set of applications is anomalous by comparing the wireless throughput measurements to the generated throughput model associated with the sampled application traffic throughputs; and sending, by the service, an anomaly detection notification based on a determination that the wireless throughput measurements from the network are anomalous, the anomaly detection notification indicative of the throughput associated with the particular application being anomalous.

2. The method as in claim 1, wherein sampling the application traffic throughputs comprises:

determining, for each of the set of applications, the probability of application traffic for the application occurring in the network; and obtaining, for each of the set of applications, the number of application throughput samples for the application in proportion to the probability of application traffic for the application occurring in the network.

3. The method as in claim 2, wherein generating the throughput model based on the sampled application throughputs for the set of applications comprises:

combining the obtained application throughput samples to form a total application throughput distribution for the set of applications, wherein the throughput model comprises the total application throughput distribution.

4. The method as in claim 3, wherein performing anomaly detection on the wireless throughput measurements from the network by comparing the wireless throughput measurements to the generated throughput model comprises:

generating, by the service, a distribution of the wireless throughput measurements; and determining, by the service, whether a distance between the distribution of the wireless throughput measurements and the total application throughput distribution exceeds a threshold.

5. The method as in claim 1, further comprising:
receiving, from a user interface, a user selection of the set of applications.

6. The method as in claim 1, further comprising:
selecting, by the service, the set of applications from among all applications present in the network based on the set of applications being the most active in the network.

7. The method as in claim 1, further comprising:
dynamically adjusting an anomaly threshold for the anomaly detection based on data indicative of performance degradation derived from packets of the application traffic.

8. The method as in claim 1, wherein generating the throughput model based on the sampled application throughputs for the set of applications comprises:
generating the throughput model for a set of one or more device types associated with the set of applications.

9. The method as in claim 1, further comprising:
adjusting, by the service, the set of applications based on feedback from a user interface regarding relevancy of the anomaly detection notification.

10. An apparatus, comprising:
one or more network interfaces to communicate with a network;
a processor coupled to the network interfaces and configured to execute one or more processes; and
a memory configured to store a process executable by the processor, the process when executed configured to:
sample application traffic throughputs for a set of applications present in a network;
generate application throughput distributions for the set of applications based on the sampled application throughputs, wherein the application throughput distributions are indicative a probability of an application having a specific throughput value;
generate a throughput model based on the sampled application throughputs, wherein the throughput model is indicative of a probability of application traffic for the set of applications occurring in the network, wherein the sampled application throughputs comprise a number of application throughput samples, for each application of the set of applications, that are obtained based on the application throughput distributions;
perform anomaly detection on wireless throughput measurements from the network to determine whether throughput associated with a particular application of the set of applications is anomalous by comparing the wireless throughput measurements to the generated throughput model associated with the sampled application traffic throughputs; and
send an anomaly detection notification based on a determination that the wireless throughput measurements from the network are anomalous, the anomaly detection notification indicative of the throughput associated with the particular application being anomalous.

11. The apparatus as in claim 10, wherein the apparatus samples the application traffic throughputs by:
determining, for each of the set of applications, the probability of application traffic for the application occurring in the network; and
obtaining, for each of the set of applications, the number of application throughput samples for the application in proportion to the probability of application traffic for the application occurring in the network.

12. The apparatus as in claim 11, wherein the apparatus generates the throughput model based on the sampled application throughputs for the set of applications by:
combining the obtained application throughput samples to form a total application throughput distribution for the set of applications, wherein the throughput model comprises the total application throughput distribution.

13. The apparatus as in claim 12, wherein the apparatus performs anomaly detection on the wireless throughput measurements from the network by comparing the wireless throughput measurements to the generated throughput model by:
generating a distribution of the wireless throughput measurements; and
determining whether a distance between the distribution of the wireless throughput measurements and the total application throughput distribution exceeds a threshold.

14. The apparatus as in claim 10, wherein the process when executed further comprises:
receiving, from a user interface, a user selection of the set of applications.

15. The apparatus as in claim 10, wherein the process when executed is further configured to:
- select the set of applications from among all applications present in the network based on the set of applications being the most active in the network.

16. The apparatus as in claim 10, wherein the process when executed is further configured to:
- dynamically adjust an anomaly threshold for the anomaly detection based on data indicative of performance degradation derived from packets of the application traffic.

17. The apparatus as in claim 10, wherein the apparatus generates the throughput model based on the sampled application throughputs for the set of applications by:
- generating the throughput model for a set of one or more device types associated with the set of applications.

18. The apparatus as in claim 10, wherein the process when executed is further configured to:
- adjust the set of applications based on feedback from a user interface regarding relevancy of the anomaly detection notification.

19. The apparatus as in claim 10, wherein the anomaly detection notification is sent to a user interface via the network.

20. A tangible, non-transitory, computer-readable medium storing program instructions that cause a device to execute a process comprising:
- sampling application traffic throughputs for a set of applications present in a network;
- generating application throughput distributions for the set of applications based on the sampled application throughputs, wherein the application throughput distributions are indicative a probability of an application having a specific throughput value;
- generating a throughput model based on the sampled application throughputs, wherein the throughput model is indicative of a probability of application traffic for the set of applications occurring in the network, wherein the sampled application throughputs comprise a number of application throughput samples, for each application of the set of applications, that are obtained based on the application throughput distributions;
- performing anomaly detection on wireless throughput measurements from the network to determine whether throughput associated with a particular application of the set of applications is anomalous by comparing the wireless throughput measurements to the generated throughput model associated with the sampled application traffic throughputs; and
- sending an anomaly detection notification based on a determination that the wireless throughput measurements from the network are anomalous, the anomaly detection notification indicative of the throughput associated with the particular application being anomalous.

* * * * *

UNITED STATES PATENT AND TRADEMARK OFFICE
CERTIFICATE OF CORRECTION

| | | |
|---|---|---|
| PATENT NO. | : 10,944,661 B2 | Page 1 of 1 |
| APPLICATION NO. | : 15/682674 | |
| DATED | : March 9, 2021 | |
| INVENTOR(S) | : Jean-Philippe Vasseur | |

It is certified that error appears in the above-identified patent and that said Letters Patent is hereby corrected as shown below:

In the Specification

Column 2, Line 38, should read:
disparate networks throughout the world, providing global Column 3, Line 50, should read:
connection). For example, a particular customer site may be Column 5, Line 33, should read:
interfaces may be configured to transmit and/or receive data Column 15, Line 16, should read:
it lies below the $1^{st}$ percentile of the expected throughput (e.g., Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*